United States Patent [19]

Henley

[11] Patent Number: 5,444,385
[45] Date of Patent: Aug. 22, 1995

[54] TESTING APPARATUS FOR LIQUID CRYSTAL DISPLAY SUBSTRATES

[75] Inventor: Francois J. Henley, Los Gatos, Calif.

[73] Assignee: Photon Dynamics, Inc., Milpitas, Calif.

[21] Appl. No.: 757,452

[22] Filed: Sep. 10, 1991

[51] Int. Cl.⁶ .......................................... G01R 19/00
[52] U.S. Cl. .................................. 324/752; 324/753; 324/770
[58] Field of Search ............. 324/158 R, 158 F, 73.1, 324/96, 750, 752, 753, 770, 765; 382/8; 358/106, 107; 359/215, 248; 257/48; 356/398, 400, 401; 348/125, 126, 175; 345/87

[56] References Cited

U.S. PATENT DOCUMENTS

| | | | |
|---|---|---|---|
| 3,889,053 | 6/1975 | Lloyd et al. | 324/158 R |
| 3,992,663 | 11/1976 | Seddick | 324/52 |
| 4,242,635 | 12/1980 | Burns | 324/158 |
| 4,355,278 | 10/1982 | Burns et al. | 324/158 |
| 4,368,523 | 1/1983 | Kawate | 365/63 |
| 4,444,801 | 4/1984 | Hongo et al. | 427/10 |
| 4,463,073 | 7/1984 | Miyauchi et al. | 430/5 |
| 4,465,969 | 8/1984 | Tada et al. | 324/96 |
| 4,507,605 | 3/1985 | Geisel | 324/73 |
| 4,510,222 | 4/1985 | Okunaka et al. | 430/5 |
| 4,523,847 | 6/1985 | Bjorklund et al. | 356/349 |
| 4,542,333 | 9/1985 | Koontz | 324/52 |
| 4,563,093 | 1/1986 | Tada et al. | 356/368 |
| 4,618,819 | 10/1986 | Mourou et al. | 324/77 |
| 4,631,576 | 12/1986 | St. John | 358/65 |
| 4,633,242 | 12/1986 | Sekiya | 340/719 |
| 4,636,403 | 1/1987 | Fisanick et al. | 427/53 |
| 4,688,900 | 8/1987 | Doane et al. | 350/347 |
| 4,727,234 | 2/1988 | Oprysko et al. | 219/121 |
| 4,758,092 | 7/1988 | Heinrich et al. | 356/36 |
| 4,776,022 | 10/1988 | Fox et al. | 382/8 |
| 4,819,038 | 4/1989 | Alt | 357/4 |
| 4,825,201 | 8/1989 | Watanabe et al. | 340/717 |
| 4,855,591 | 8/1989 | Nakamura et al. | 250/225 |
| 4,862,075 | 8/1989 | Choi et al. | 324/158 |
| 4,868,492 | 11/1989 | Beha et al. | 324/73 |
| 4,875,006 | 10/1989 | Henley et al. | 324/158 |
| 4,899,105 | 2/1990 | Akiyama | 324/158 |
| 4,906,922 | 6/1990 | Takahashi et al. | 324/158 |
| 4,910,458 | 3/1990 | Forsyth et al. | 324/158 |
| 4,944,576 | 7/1990 | Lacker et al. | 350/334 |
| 4,983,911 | 1/1991 | Henley | 324/158 |
| 4,999,577 | 3/1991 | Beha et al. | 324/158 |
| 5,017,755 | 5/1991 | Yahagi et al. | 219/121 |
| 5,037,683 | 7/1991 | Takahashi et al. | 324/158 |
| 5,043,297 | 8/1991 | Suzuki et al. | 437/51 |

FOREIGN PATENT DOCUMENTS

| | | |
|---|---|---|
| 3111393A1 | 9/1982 | Germany . |
| 55-56330 | 4/1980 | Japan . |
| 56-58893 | 4/1980 | Japan . |

OTHER PUBLICATIONS

System Tests Devices at GHz Rates, Lyle H. McCarty, Design News, Apr. 10, 1989.
Electro–Optic Device Tester Tops 1 GHz, John Novellino, Electronic Design, Sep. 8, 1988.

(List continued on next page.)

*Primary Examiner*—Vinh P. Nguyen
*Attorney, Agent, or Firm*—Townsend and Townsend Khourie and Crew

[57] ABSTRACT

A display panel testing apparatus, for observing large areas of a test panel, including an electro-optical element having optical properties that change to form images when an electric field is impressed thereon. The electro-optical element has a first surface facing a test panel that forms the electric field. The first surface and the test panel having a gap therebetween. The display panel testing apparatus also includes a light receptor for receiving the images from the electro-optical element and in particular a second surface of the electro-optical element. The display panel testing apparatus further includes a movable stage and movable mirrors coupled to the movable stage. The movable mirrors are adjustable to direct desired portions of the images onto the light receptor from desired positions of the electro-optical element. The movable stage also allows the movable mirrors to be positioned over the desired portions of the electro-optical element to receive the images portions therefrom.

11 Claims, 3 Drawing Sheets

OTHER PUBLICATIONS

An Ultra High Speed Test System, Francois J. Henley, IEEE Design & Test of Computers, Feb. 1989.

**Electro-Optic Technology Supports Gigahertz Speeds; Francois J. Henley, Electronics Test, Sep. 1988.

** Using Electro-Optic Sampling Technology for Accurate Gigahertz AtE: Overview of the Art, Francois J. Henley, 1990 IEEE VLSI Test Symposium.

High Speed Pattern Generator and GaAs Pin Electronics for a Gigahertz Production Test System, D. J. Kratzer, S. Barton, F. J. Henley D. A. Plomgrem, Proceedings of IEEE 1988 Int'l Test Conf, Sep. 1988.

Test Head Using Electro-Optic Receivers and GaAs Pin Eloectronics for a Gigahertz Production Test System, F. J. Henley, H. J. Choi, Proceedings of IEEE 1988 Int'l Test Conference, Sep. 1988.

Achieving AtE Accuracy at Gigahertz Test Rates: Comparison of Electronic and Electro-Optic Sampling Technologies, F. J. Henley, H. J. Choi, Int'l Test Conf. Aug., 1989.

Systems Solutions Based on Electro-Optic Sampling to High Speed IC Test Problems, F. J. Henley, D. B. MacDonald, SPIE vol. 795 Characterization of Very High Speed Semiconductor Devices & Integrated Circuits (1987) pp. 345-351.

Characterization of High Speed (Above 500 MHz) Devices Using Advanced AtE-Techniques, Results and Device Problems, S. Barton, Proceedings of the IEEE 1989, Int'l Test Conf., Aug. 1989.

Testing and Qualifications of A-Si TFT-LC Color Cells for Military Avionics Applications; F. C. Luo et al.; SID 90 Digest; pp. 194-196.

Hitachi LCD Advertisement; pp. 2 and 3.

Measurement of Electro-Optic Characteristics of LCDs; M. E. Becker et al.; SID 90 Digest; pp. 163-166.

Testing and Qualificastionsof A Si TFT-LC Color Cells for Military Avionics Applications; F. C. Luo et al; SID 90 Digest; pp. 194-196.

In-Process Testing of Thin Film Transistor Arrays; R. Wisnieff et al.; SID 90 Digest pp. 190-193; 1990.

NCAP Displays: Optical Switching and Dielectric Properties: L. Welsh et al.; SID 90 Digest; pp. 220-223; 1990.

TESTING APPARATUS FOR LIQUID CRYSTAL DISPLAY SUBSTRATES

BACKGROUND OF THE INVENTION

The present invention relates to a testing apparatus for the purpose of testing for defects in liquid crystal display substrates used in liquid crystal display panels and the like.

Active matrix liquid crystal displays have been used in the realization of liquid crystal display panels having a high number of pixels for use in liquid crystal displays, including televisions or the like. These have a construction which is provided with switching circuits which operate by using thin film transistors to drive the various pixels. The number of pixels generally reaches 250,000 to 500,000, and units with more than 1,000,000 have reached the marketplace.

Conventionally, in the manufacturing of liquid crystal display panels of this type of active matrix, a process has been used in which first pixel electrodes corresponding to each pixel are disposed in a matrix form on a substrate of glass or the like, and by means of the formation of gate lines and source lines which are connected to each of these pixel electrodes and thin film transistors corresponding to each of these pixel electrodes, an active matrix liquid crystal display substrate (hereinafter shortened to "liquid crystal substrate") is manufactured. Next a transparent substrate is disposed above this liquid crystal substrate and facing it through the medium of a space, and the gap formed between the liquid crystal substrate and the transparent substrate is filled with liquid crystal.

This type of liquid crystal substrate comprises a plurality of pixel electrodes and lines corresponding thereto, as well as thin film transistors, are all manufactured in clean rooms which are so controlled by means of various layer formation processes so as to contain an extremely small amount of dust. However, in liquid crystal substrates with a large number of pixels, the size of each pixel and the widths of the lines are extremely fine, so that the presence of a small amount of microdust included in the manufacturing atmosphere is directly connected to the quantity of open-circuit defects or short circuit defects of the gate lines or the source lines, or the like. In addition, a maximum defect level is permitted on each liquid crystal substrate. Liquid crystal substrates with extremely large numbers of pixels are manufactured with the current manufacturing technology, it is extremely difficult to keep the number of defects below the permitted limit, and the rate of unacceptable units is remarkably high.

Moreover, in the case of the manufacture of liquid crystal substrates of the above type, it is necessary to test for defects in the manufactured liquid crystal substrates, however, conventionally, in the manufacturing process of the liquid crystal substrates, there was no effective technique for the testing of defects in the liquid crystal substrates themselves, and as a result, only after the completion of the liquid crystal display panel was a test conducted by supplying an electric current through the liquid crystal display panel and observing whether each pixel actually functioned or not. At this point, even if defects were detected by the testing, it was difficult to conduct repair or the like on the liquid crystal substrates and thus the products had to be rejected and disposed of, and this was a factor which prevented an improvement in the rate of acceptable products among active matrix liquid crystal display panels, and a lowering of the manufacturing costs thereof.

SUMMARY OF THE INVENTION

In an apparatus for the purpose of detecting defects in liquid crystal display substrates having gate lines, source lines, pixel electrodes, and thin film transistors on a surface, there are special characteristics according to which on the front surface side of the above liquid crystal display substrate, an electro-optical element, the optical properties of which change when an electrical field is impressed thereon, is disposed in a facing manner and with a very small gap therebetween, a voltage is impressed by means of a power source between this electro-optical element and each pixel electrode on the liquid crystal display substrate and light is radiated onto the back surface of the above electro-optical element from a source; the reflected light is received by a light receptor and observed, and on the back surface side of the above electro-optical element, a reflecting mirror, which is for the purpose of reflecting the light emitted from the above light source in the direction of the electro-optical element, and reflecting the reflected light from the electro-optical element in the direction of the above light receptor, is provided in a freely movable fashion along the back surface of the electro-optical element.

The optical properties of the electro-optical element change when an electric field is impressed thereon; this electro-optical element is disposed facing the liquid crystal substrate which is the object of testing and with a small gap therebetween and when an electric current is caused to flow between the pixel electrodes on this liquid crystal substrate and the electro-optical element by means of a power source, the electric fields generated by each pixel electrode change in response to the presence or state of defects in the liquid crystal substrate, and accompanying this, the optical properties of the electro-optical element change in varied ways. In addition, by radiating light onto the electro-optical element from a light source, receiving the reflected light in a light receptor and observing the state of the reflected light, it is possible to detect the state of the change of the optical properties of the electro-optical element, and by means of this, the presence or the state of defects in the liquid crystal substrate can be ascertained.

In addition, in the apparatus of the present invention, at the time of testing, the electro-optical element, the light source, and the light receptor are all set at fixed positions, however, by means of moving the reflecting mirror on the back surface side of the electro-optical element, the light from the light source is reflected by this reflecting mirror and radiated successively onto the entire surface of the electro-optical element, and the reflected light from the electro-optical element is reflected by means of the reflecting mirror and successively received by the light receptor, and by means of this, testing is continually carried out on the entire surface of the liquid crystal substrate.

The present invention was created to solve this problem. It is an object of the present invention to provide an effective apparatus which can test for defects in the liquid crystal substrates used in liquid crystal display panels, and the like.

DESCRIPTION OF A PREFERRED EMBODIMENT

Figure 4:
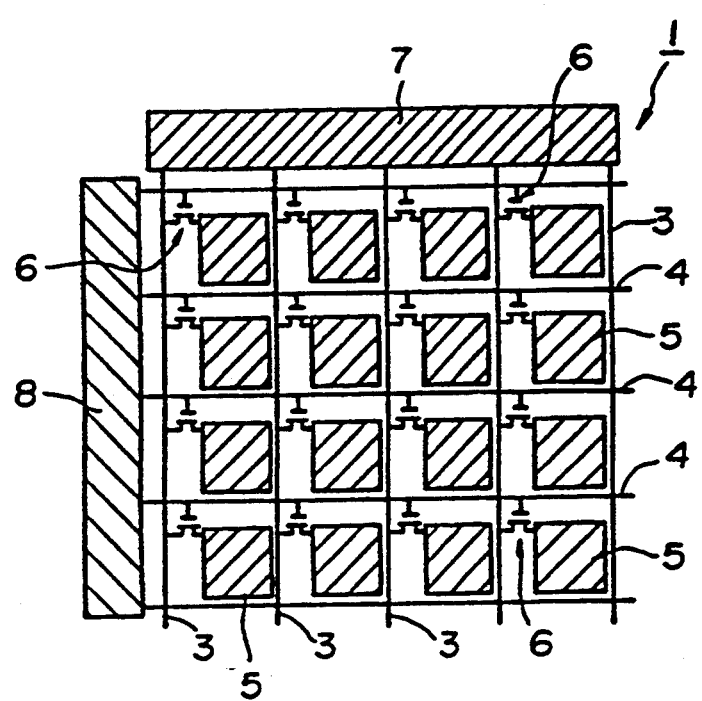
FIG. 4 is a diagram showing an example of a liquid crystal substrate which is the object of testing.

First, the liquid crystal substrate of FIG. 4 which is to be tested will be explained. The liquid crystal substrate i is commonly known and is used in liquid crystal display panels and the like; it is constructed, for example, by forming a plurality of source lines 3 for the purpose of transmitting data signals and a plurality of gate lines 4 for the purpose of transmitting scanning signals in an aligned state on the surface of a substrate 2 which is of glass or the like, and forming pixel electrodes 5 between these source lines 3 and gate lines 4 and connecting these pixel electrodes 5 to source lines 3 and gate lines 4 through the medium of thin film transistors 6, which are switching elements. Furthermore, reference number 7 indicates a shorting bar which is connected to source lines 3 and reference number 8 indicates a shorting bar which is connected to gate lines 4. These shorting bars 7 and 8 are for the purpose of preventing static electricity which causes deleterious effects on thin film transistor 6 and also serve the purpose of impressing voltage on each of the source lines 3 and gate lines 4 at the time of the testing described hereinbelow; however, these shorting bars 7 and 8 are removed at the time of the completion of liquid crystal substrate 1.

Figure 3:
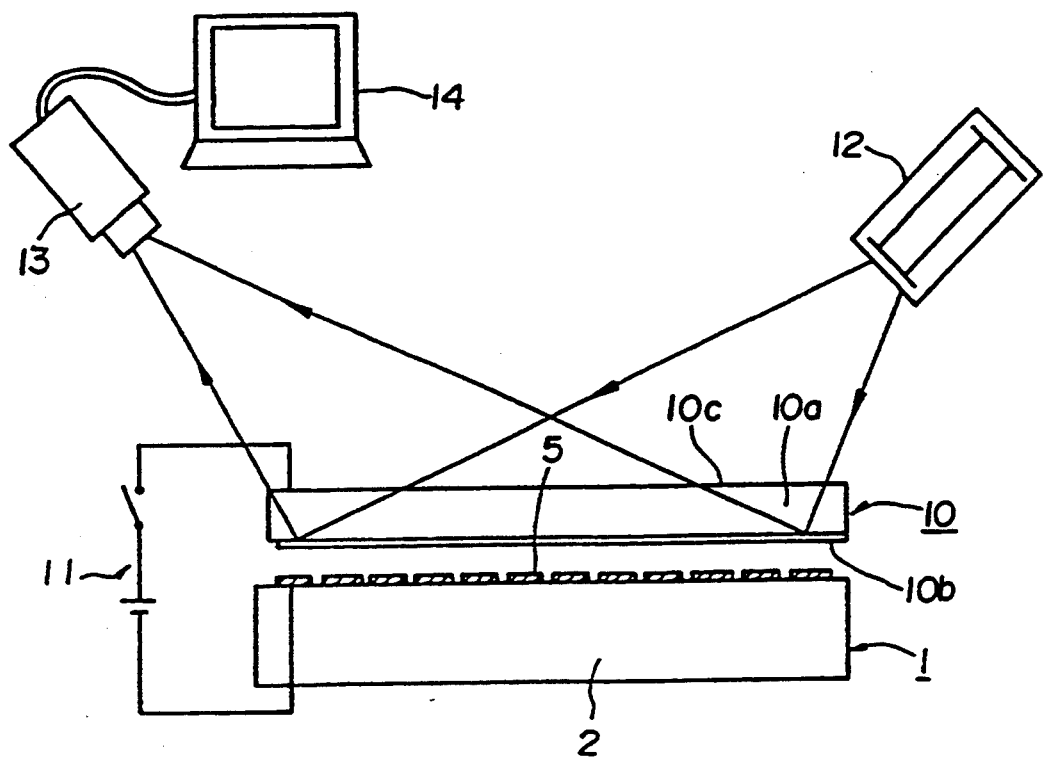
FIG. 3 a diagram for explaining the basic construction of the same apparatus and the operational principle thereof.

The testing apparatus of the present preferred embodiment serves the purpose of testing for defects in the liquid crystal substrate 1 explained above, that is, testing for open-circuit defects or short circuits in source lines 3, gate lines 4 or pixel electrodes 5; first, the basic construction and operational principle will be explained by FIG. 3. In FIG. 3, reference number 10 indicates an electro-optical element which is of the same size as the liquid crystal substrate 1 which is the object of testing, and is disposed facing the front surface side of the liquid crystal substrate 1 with a small gap on the level of tens of microns therebetween, reference number 11 indicates a power source which is for the purpose of impressing a voltage between the electro-optical element 10 and the pixel electrodes 5 of the liquid crystal substrate 1, reference number 12 indicates a light source which radiates light onto the back surface (in FIG. 3, the upper surface) of electro-optical element 10, reference number 13 indicates a light receptor which receives the reflected light from electro-optical element 10 and reference number 14 indicates a monitor for the purpose of observing the picture screen by light receptor 13.

The above electro-optical element 10 uses a liquid crystal sheet or Pockels crystal, or the like, the optical properties of which change when an electric field is impressed thereon; in the elements shown in FIG. 3, a light reflecting body 10b, such as a dielectric multilayer, or the like, is formed on or attached to the bottom surface of a liquid crystal sheet 10a consisting of a transparent case, the interior of which is filled with liquid crystal, and on the upper surface thereof, a thin-layer transparent electrode 10c is formed. Concretely, the light-transmission rate of the above liquid crystal sheet 10a changes as a result of the size of the electric field generated within liquid crystal sheet 10a, like NCAP (Nematic Curvilinear Aligned Phase) or the like. In this case, as the liquid crystal which fills the interior of liquid crystal sheet 10a, liquid crystals are preferable which have a form in which drop-shaped liquid crystals are dispersed in a high molecular substance, for example, in a polymer, and the size of the spheres (droplets) of the high molecular substance which contains the r liquid crystal are controlled, and by the ON/OFF state of the electric field, a transparent state or a scattering state is caused to appear by means of the agreement or nonagreement of the index of refraction of the high molecular substance and the liquid crystal. As another example of electro-optical element 10, it is possible to use a Pockels crystal in which the amount of polarization of the reflected light changes by means of the strength of the electric field impressed; as long as the optical properties thereof, such as the transmission rate of light, or the amount of polarization of the reflected light change by a fixed proportion when an electrical field is impressed thereon, then the electro-optical element is not limited to the above, but other electro-optical elements may be used.

Furthermore, the above power source 11 is electrically connected to the thin film transparent electrode 10c of electro-optical element 10 and shorting bars 7, 8 (see FIG. 4) of liquid crystal substrate 1 and impresses a voltage on all pixel electrodes 5 on liquid crystal substrate 1 through source lines 3 and gate lines 4. A power source 11 is preferred which can impress a pulse voltage separately on source lines 3 and gate lines 4, and can freely change this pulse voltage, pulse width, and period. Furthermore, it is acceptable to use, for example, a halogen lamp as light source 12, however, it is also acceptable to use any type of laser light. Furthermore, it is acceptable to use a CCD camera, or the like, as light receptor 13.

In the above testing apparatus, when voltage is applied between liquid crystal substrate 1 and electro-optical element 10 by power source 11, the electrical field generated by each pixel electrode 5 changes in response to the presence or state of defects in liquid crystal substrate 1, and along with this, the optical properties of electro-optical element 10 change in various ways. Accordingly, the reflected light which was radiated onto electro-optical element 10 is received by light receptor 13 and the state of this reflected light is observed in monitor 14, and by means of the analysis of this image data by an image processing technique, it is possible to determine the state of the change in the optical properties of electro-optical element 10 and based on this, the presence and state of defects in liquid crystal substrate 1 itself can be ascertained.

In other words, for example, when open-circuits are caused in pixel electrodes 5, gate lines 3, source lines 4 or other parts on liquid crystal substrate 1, even if a current is supplied by power source 11, a part of pixel electrodes 5 does not function, and as a result, the optical properties of the electro-optical element 10 above the pixel electrodes 5 which do not function do not change. Furthermore, in the case in which there is a short-circuit, abnormal phenomena such as the operation of electro-optical element 10 are caused by the application of an electric current to one or the other of source lines 3 or gate lines 5, for example, and by means of this, it is known that short circuit defects have occurred.

In the case in which it is possible to irradiate the entire back surface of electro-optical element 10 once with light from the above light source 12 and it is possible that light receiver 13 receive the reflected light from the entire surface of electro-optical element 10 at once, the scope of the radiation of light from light source 12 and the scope of the reception of light receiver 13 naturally have limits and accordingly, in the case in which the surface of the electro-optical element 10 which is disposed facing liquid crystal substrate 1, and liquid crystal substrate 1 reaches a certain size, only a portion of electro-optical element 10 can be radiated with light, and only the reflected light from this part can be received, therefore, it is not possible to conduct testing on the whole surface of a large liquid crystal substrate 1 at once, and there is a necessity to repeatedly conduct partial testing.

Here, the testing apparatus of the present preferred embodiment is so constructed as to continuously and efficiently conduct testing on large liquid crystal substrates by being provided with a reflecting mirror which is freely movable on the back surface side of the electro-optical element 10, and hereinafter, the concrete composition of the testing apparatus of the present preferred embodiment will be explained with reference to FIGS. 1 and 2.

Figure 1:
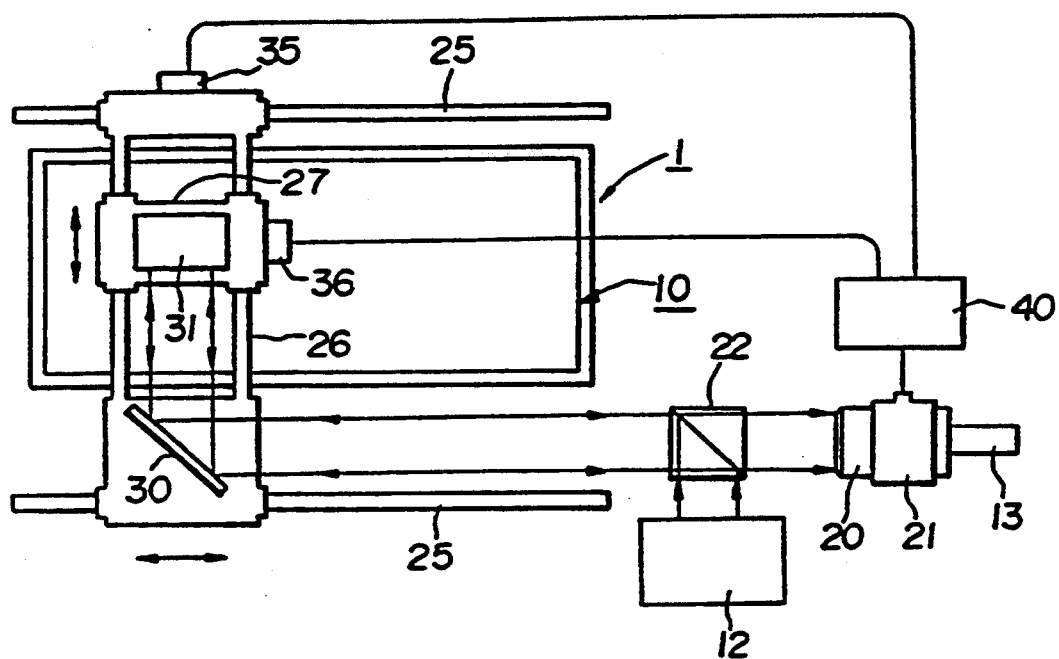
FIG. 1 is a top view of the main parts of the testing apparatus which is the preferred embodiment of the present invention.
Figure 2:
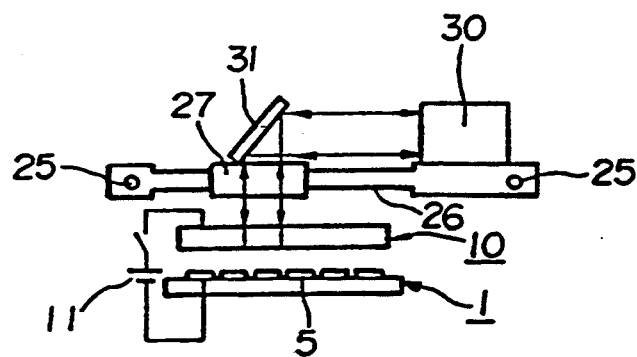
FIG. 2 is a side view of the main parts of the same apparatus.

In FIGS. 1 and 2, reference numbers 12 and 13 indicate the light source and the light receptor (CCD camera) which were already explained in FIG. 3, reference number 20 indicates a lens which is provided in light receptor 13, reference number 21 indicates a focus adjusting apparatus which is for the purpose of moving lens 20 and adjusting the focal point of light receptor 13, and reference number 22 indicates a semitransparent mirror. Furthermore, reference number 25 indicates a pair of guide parts which are provided on the back surface side of electro-optical element 10 and in a parallel fashion with respect to electro-optical element 10, reference number 26 indicates a first slider which is provided between guide parts 25, is supported in a parallel fashion with respect to electro-optical element 10, and is freely movable along guide parts 25, reference number 27 indicates a second slider which is attached to the first slider 26 and is freely movable in a direction which is perpendicular to the direction of movement of the first slider 26.

In addition, a first reflecting mirror 30 is provided on the first slider 26, and on the second slider 27, a second reflecting mirror 31 is provided. The first reflecting mirror 30 reflects the light reflected by semitransparent mirror 22 towards the second reflecting mirror 31, and furthermore, the second reflecting mirror 31 reflects the light from first reflecting mirror 30 in the direction of electro-optical element 10 and emits this light vertically with respect to electro-optical element 10; these directions are precisely so set. Then the reflected light of the light radiated from light source 12, and radiated by means of the above path onto electro-optical element 10, follows a path opposite to that above and reaches semitransparent mirror 22, passes directly through semitransparent mirror 22, through lens 20, and is received by light receptor 13.

Furthermore, sensors 35 and 36 which detect the amount of displacement from a standard position, are attached to the above first and second sliders 26 and 27, and the output signals of these sensors 35 and 36 are input into position detection apparatus 40. Rotary encoders or linear encoders are for example used for the position detection apparatus 40, it detects the positions of the first and second reflecting mirrors 30 and 31 from the output signal of sensors 35 and 36 and detects the radiated position of the light onto the electro-optical element 10 and based on this determines the distance from light receiver 13 to the radiated position, outputs a control signal to the focus adjusting apparatus 21, and this focus adjusting apparatus 21 moves lens 20 and adjusts the focal point of light receiver 13. By means of this, even if the first and second sliders 26 and 27 move, and the radiated position of the light changes, the focal point of light receiver 13 is naturally adjusted, and a clear image can be obtained. It is possible to adopt a autofocus mechanism for use in place of the above sensors 35, 36 and position detection apparatus 40.

In a testing apparatus with the above construction, by means of the synchronized movement of the first and second sliders 26 and 27, the first and second reflecting mirrors 30 and 31 are moved along the rear surface of electro-optical element 10 and the radiated position of the light from light source 12 is successively changed and thereby testing is carried out over a continuous manner over the entire liquid crystal substrate 1. Accordingly, even if the liquid crystal substrate 1, which is the object of testing, is large, it is possible to conduct testing efficiently and in a short time over the whole surface of the liquid crystal substrate 1, so that this particularly preferable at the time of testing of large size liquid crystal substrates 1.

It is possible to conduct identical testing without using the above reflecting mirrors 30 and 31 by means of making light source 12 and light receiver 13 freely movable and by successively moving the same, however, in the case having such a construction, in comparison with the case in which reflecting mirrors 30 and 31 are caused to move, it cannot be avoided that the entire testing apparatus becomes more complicated and larger, and the costs thereof rise. In contrast, in the above preferred embodiment, only reflecting mirrors 30 and 31 are caused to move, while light source 12 and light receiver 13 are in a fixed state when testing is carried out, so that the apparatus as a whole can be made simple, small, and the costs thereof can be kept low.

What is claimed is:

1. In a panel testing apparatus for observing large areas of a test panel comprising an electro-optical element having optical properties that change to form images when an electric field is impressed thereon, said electro-optical element further comprising a first surface facing a test panel that forms said electric field and said first surface and said test panel having a gap therebetween, and a light receptor for receiving desired portions of said images from said electro-optical element and in particular a second surface, said panel testing apparatus comprising:

a movable stage means;

a movable mirror means coupled to said movable stage means, said movable mirror means being adjustable to direct portions of images onto said light receptor from desired positions of said electro-optical element; and wherein said movable stage means allows said movable mirror means to be positioned over said desired portions of said electro-optical element to receive said images portions therefrom, and wherein said movable mirror means comprises a first mirror and a second mirror, said first mirror directs said images portions from said electro-optical element to said second mirror, and said second mirror directs said images portions from said first mirror to said light receptor.

2. The apparatus of claim 1 wherein said movable mirror means adjusts to direct a light from a light source onto said electro-optical element.

3. The apparatus of claim 2 wherein said light source adjusts to direct said light from said light source to said movable mirror means onto said electro-optical element.

4. The apparatus of claim 3 wherein said movable mirror means is fixed.

5. The apparatus of claim 1 wherein said first surface is a front surface and said second surface is a back surface.

6. The apparatus of claim 1 wherein said movable stage comprises an x-y stage, said x-y stage comprising an x-slider and a y-slider.

7. The apparatus of claim 1 wherein said movable stage comprises a position detection means, said position detection means comprising a plurality of sensors.

8. The apparatus of claim 1 wherein said images portions are analyzed by image processing techniques for the presence of defects.

9. The apparatus of claim 1 wherein said gap is of tens of microns.

10. The apparatus of claim 1 wherein said light receptor is adjustable to direct portions of said images from said desired positions of said electro-optical element to said movable mirror means onto said light receptor.

11. The apparatus of claim 1 wherein said movable mirror means is fixed.

* * * * *